H. C. MARMON.
POWER TRAIN MOUNTING FOR AUTOMOBILES.
APPLICATION FILED MAR. 7, 1913.
1,103,524.
Patented July 14, 1914.
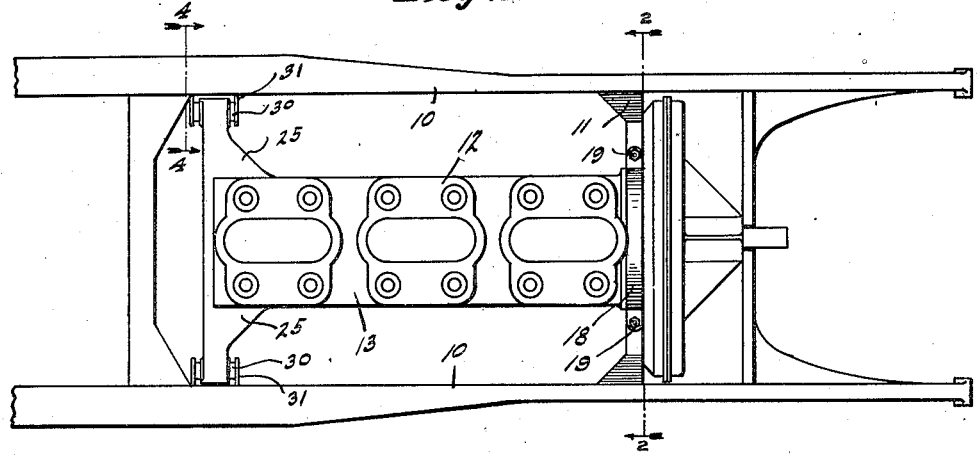
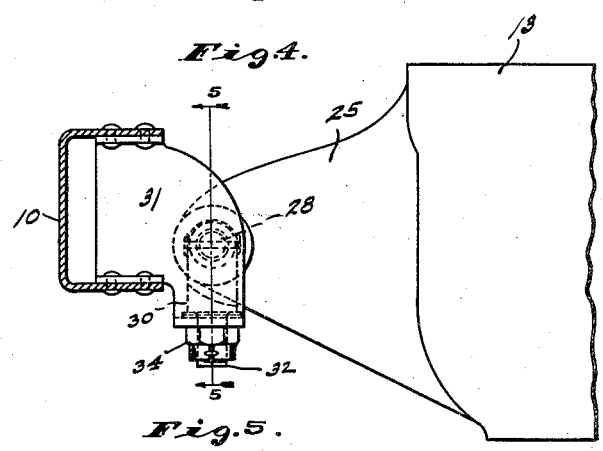
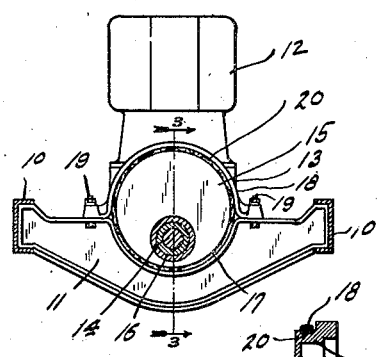
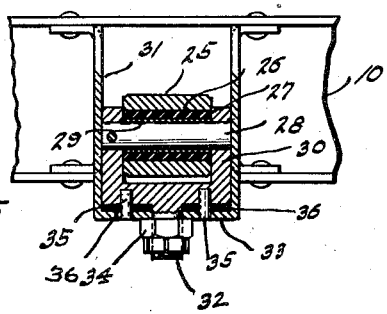
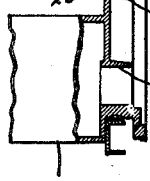
Witnesses
Frank A. Fahle
Josephine Gasper
Inventor
Howard C. Marmon,
By Arthur M. Hood
Attorney

UNITED STATES PATENT OFFICE.

HOWARD C. MARMON, OF INDIANAPOLIS, INDIANA, ASSIGNOR TO NORDYKE & MARMON COMPANY, OF INDIANAPOLIS, INDIANA, A CORPORATION OF INDIANA.

POWER-TRAIN MOUNTING FOR AUTOMOBILES.

1,103,524.     Specification of Letters Patent.     Patented July 14, 1914.

Application filed March 7, 1913. Serial No. 752,602.

*To all whom it may concern:*

Be it known that I, HOWARD C. MARMON, a citizen of the United States, residing at Indianapolis, in the county of Marion and State of Indiana, have invented a new and useful Power-Train Mounting for Automobiles, of which the following is a specification.

My invention relates to the mounting of automobile engines, and its object is so to mount the engine that on the one hand its jar is not transmitted to the automobile frame and on the other it is not subjected to the strains due to the twisting forces to which the automobile frame is subjected but is nevertheless held firmly in proper position relative to such frame.

In carrying out my invention, I provide one end of the engine with an annular member offset upwardly from the axis of the crank shaft, and clamp such annular member in the automobile frame with an interposed resilient member, and provide the other end of the engine with a pair of arms resiliently attached to the automobile frame.

The accompanying drawing illustrates my invention.

Figure 1 is a plan view of the front end of an automobile chassis and associated engine, embodying my invention; Fig. 2 is a section on the line 2—2 of Fig. 1; Fig. 3 is a section on the line 3—3 of Fig. 2; Fig. 4 is a section on the line 4—4 of Fig. 1; and Fig. 5 is a section on the line 5—5 of Fig. 4.

The automobile chassis has the usual longitudinal side bars 10 connected by suitable cross bars, including a cross bar 11 at the front end of the engine 12. The engine has the usual crank case 13 and crank shaft 14, and the front end of the crank case 13 is provided with an annular member 15 which is offset vertically upward from the center of the crank case so that the crank shaft 14 projects through a bearing 16 in said annular member 15 at a point vertically below the center of the latter. The cross bar 11 is provided with a central arc-shaped depression or bed in which the annular member 15 fits, said annular member being held in place by a clamping strap 18 which extends over it and is fastened to the cross bar 11 by suitable bolts 19. The annular member 15 is surrounded by a ring 20 of suitable resilient material, such as rubber, which is interposed between such annular member and the bed 17 and strap 18.

The crank case 13 at its rear end is provided with a pair of opposite laterally extending arms 25, which at their ends are provided with holes 26 parallel to the crank shaft 14. In each of these holes is a resilient bushing 27, conveniently of rubber, through which extends a pin 28, which may be separated from the bushing by a thin metal tube 29 for preventing frictional wear on the bushing. The ends of the pin 28 are supported in the two upwardly projecting arms of a forked member 30, which rests in a stirrup 31 fastened to and extending inwardly and downwardly from the adjacent longitudinal bar 10 of the chassis. The forked member 30 has a downward threaded projection 32 extending through the base 33 of the stirrup 31, said projection 32 being provided with a lock nut 34 for holding the forked member 30 in the stirrup. Dowel pins 35 prevent relative movement of the forked member and stirrup about a vertical axis. Between the bottom of the forked member 30 and the base 33 of the stirrup 31 is a layer 36 of resilient material, such as rubber.

In operation, the resilient material 20, 27, and 36 prevents the twists to which the chassis is subjected from being transmitted to the engine, and also prevents jarring due to the engine from being transmitted to the chassis and thence to the car occupants. At the same time, the engine and chassis are firmly held in proper relationship to each other. The offsetting of the annular member 15 upward from the crank shaft axis serves to make the engine more stable, reducing the tendency for it to move from its position by reason of the reactions of the crank shaft on the engine pistons.

I claim as my invention:

1. In combination, an automobile chassis, an engine, said engine having at one end an annular member offset vertically upward from the axis of the engine crank shaft, and said chassis having a cross bar having in its upper surface a bed in which said annular member fits, a clamp for holding said annular member in said bed, and a ring of resilient material interposed between said annular member and said bed and clamp.

2. In combination, an automobile chassis, an engine, said engine having at one end an annular member, and said chassis having a cross bar having in its upper surface a bed in which said annular member fits, a clamp for holding said annular member in said bed and also fitting said annular member, and a ring of resilient material interposed between said annular member and said bed and clamp.

3. In combination, an automobile chassis, an engine, said engine having at one end an annular member offset vertically from the axis of the engine crank shaft, and said chassis having a cross bar having in its upper surface a bed in which said annular member fits, a clamp for holding said annular member in said bed, and a ring of resilient material interposed between said annular member and said bed and clamp.

4. In combination, an automobile chassis, an engine having at one end a pair of oppositely laterally projecting arms, stirrups supported by the chassis and extending inwardly and downwardly therefrom, said arms resting in said stirrups, and being provided with horizontal holes extending through them, pins supported by said stirrups and extending through said holes, and bushings of resilient material spacing said pins from said arms.

5. In combination, an automobile chassis having a cross bar provided in its upper surface with a bed, an engine provided at one end with a member which fits in said bed, a clamping member also fitting said member and holding it in place in said bed, a ring of resilient material spacing said member from said bed and said clamping member, said engine being provided at the other end with a pair of arms projecting laterally and oppositely therefrom, stirrups supported by said chassis and forming rests for said arms, and resilient material between said stirrups and said arms.

6. In combination, an automobile chassis having a cross bar provided in its upper surface with a bed, an engine provided at one end with a member which fits in said bed and is offset so that its center is vertically above the axis of the engine crank shaft, a clamping member holding said member in place in said bed, resilient material spacing said member from said bed and said clamping member, said engine being provided at the other end with a pair of arms projecting laterally and oppositely therefrom, stirrups supported by said chassis and forming rests for said arms, and resilient material between said stirrups and said arms.

In witness whereof, I, have hereunto set my hand at Indianapolis, Indiana, this fifth day of March, A. D. one thousand nine hundred and thirteen.

HOWARD C. MARMON.

Witnesses:
ARTHUR M. HOOD,
FRANK A. FAHLE.